United States Patent [19]
Zeichman

[11] 3,787,039
[45] Jan. 22, 1974

[54] PNEUMATIC HOLD DOWN TABLE
[76] Inventor: Robert G. Zeichman, 2070 Eldon N.E., Grand Rapids, Mich.
[22] Filed: Feb. 4, 1972
[21] Appl. No.: 223,597

[52] U.S. Cl............... 269/13, 108/150, 144/288 R, 193/35 R, 248/363, 269/21
[51] Int. Cl.......................... B25b 11/08, B25h 1/02
[58] Field of Search. 269/21, 13, 14, 289, 296, 303, 269/308; 248/363; 108/80, 81, 150, 151, 152; 193/35 R, 35 A, 35 T, 35 E, 35 F, 35 G, 35 SS, 35 J; 144/286 R, 288 C; 83/156, 157

[56] References Cited
UNITED STATES PATENTS
| | | | |
|---|---|---|---|
| 1,851,028 | 3/1932 | Worrall | 248/363 |
| 2,350,449 | 6/1944 | Couch | 193/35 TE |
| 2,598,204 | 5/1952 | Allen | 128/74 |
| 2,722,243 | 11/1955 | Nagy | 193/35 TE |
| 3,130,829 | 4/1964 | Long | 193/35 SS |

Primary Examiner—Granville Y. Custer, Jr.
Assistant Examiner—Neil Abrams
Attorney, Agent, or Firm—John E. McGarry

[57] ABSTRACT

A hold down table for planar work pieces and the like to enable workmen to work completely around the edges of the table and permitting the planar workpiece to be moved into position by sliding along the top of the table. Means, preferably vacuum means, firmly grip and hold the workpiece when in the proper position. The table has a pair of arms which are mounted on a frame to swing upwardly to support the workpiece above the top of the gripping and holding means. The arms are also mounted for movement downwardly and inwardly to lower the workpiece onto the gripping and holding means. The movement of the arms inwardly permits the worker to move completely about the edge of the workpiece. In the preferred embodiment vacuum is drawn on the holding and gripping means by a venturi. The arms are supported and moved by fluid cylinders which are operated by a valve coupled to a fluid supply source, the valve also controlling the operation of the venturi.

12 Claims, 4 Drawing Figures

PATENTED JAN 22 1974 3,787,039

PNEUMATIC HOLD DOWN TABLE

BACKGROUND OF THE INVENTION

1. Field of the Invention

This invention relates to hold down tables for securely gripping workpieces, and preferably planar wood pieces, for work at the edges thereof. In one of its aspects thereof, the invention relates to a fluid operated hold down table having conveyor means for moving the workpiece into position on the hold down table, the conveyor means being retractable during operation of the holding means for the workpiece so that work can be done at all edges of the workpiece.

2. State of the Prior Art

In woodworking operations in making of large table panels and the like, a pressed wood core is conventionally laminated with plastic or wood veneer. The edges of the veneer must be filed and routed to the size of the wood core around each edge of the panel. Before or after the top and bottom lamina are applied, edge molding is applied to the edges of the panels. The edges must be again routed to remove excess edge molding. Heretofore, the panels, weighing 50 lbs. or more, must be positioned on a work table which securely holds the panel during the edge working operations. The table must hold the panel in a central portion so that the worker can move completely about the table for working on all edges thereof. To increase productivity, lifting and physical carrying of the workpieces by the worker to and from the work tables should be avoided.

Currently, such panels are positioned on relatively small pads and a clamping arm suspended above the pad comes down to clamp the panels against the small pad. The clamping arm must be actuated by the operator reaching over the panel. While this arrangement permits the operator to move completely around the panels, the panels must nevertheless be carried by the workers to and from the work table. Further, the top edge only of the panels is filed and routed. After the operation, the panels must be removed from the work table and turned over so that the bottom edge can be routed and filed. The panel must be removed from the table, turned, and replaced on the table to avoid hitting the clamping arm.

A vacuum hold down table useful for holding workpieces is disclosed in U.S. Pat. No. 1,851,028. This table, however, still requires a hand operation in transfer of the workpiece to and from the work table.

STATEMENT OF THE INVENTION

I have now discovered an improved hold down table having a support means for supporting the workpiece centrally and conveyor support arms which support the workpiece for lateral movement above the support means. The conveyor arms are pivotably mounted to lower the workpiece onto the support means and to fold beneath the workpiece so that the worker can walk completely around the workpiece. The support means includes a suction cup and means for drawing a vacuum thereon. The arms are operated by fluid cylinders for upward and downward movement. Vacuum is drawn by a venturi valve which operates in conjunction with a supply of fluid pressure to the air cylinders so that the venturi valve is ineffective when the arms are raised and the venturi valve is effective to draw vacuum when the arms are lowered.

The hold down table can conveniently be positioned in an assembly line so that manual lifting and carrying of the workpieces is avoided. The hold down table can operate in conjunction with a device for turning the workpieces so that all lifting of the workpieces is avoided. Yet, while the work is being done on the work piece, the worker is able to completely walk around the entire workpiece so that work can effectively be done at all edges of the workpiece.

BRIEF DESCRIPTION OF THE DRAWINGS

The invention will now be described with reference to the accompanying drawings in which.

DETAILED DESCRIPTION OF THE PREFERRED EMBODIMENT

Figure 1:
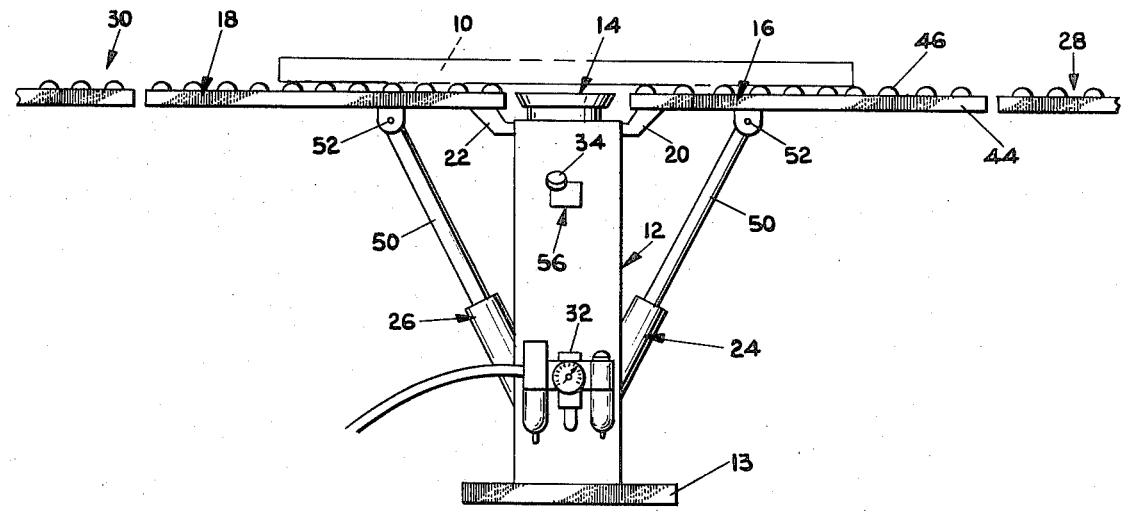
FIG. 1 is a side elevational view of the hold down table according to the invention.
Figure 3:
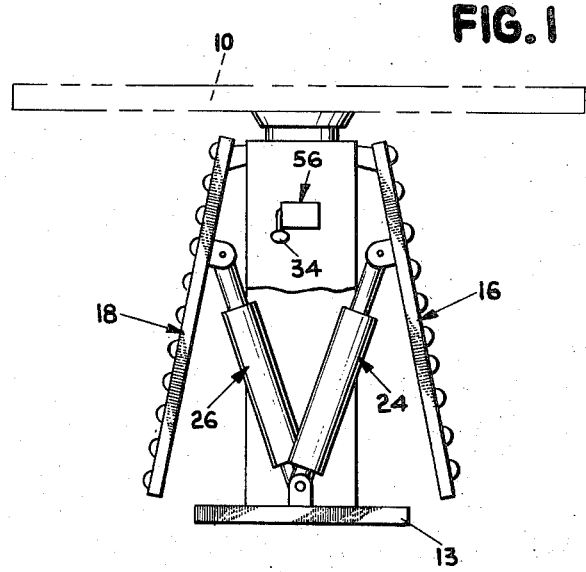
FIG. 3 is a side view of the hold down table like FIG. 1 but partially broken away illustrating the table in position for holding the work piece.
Figure 2:
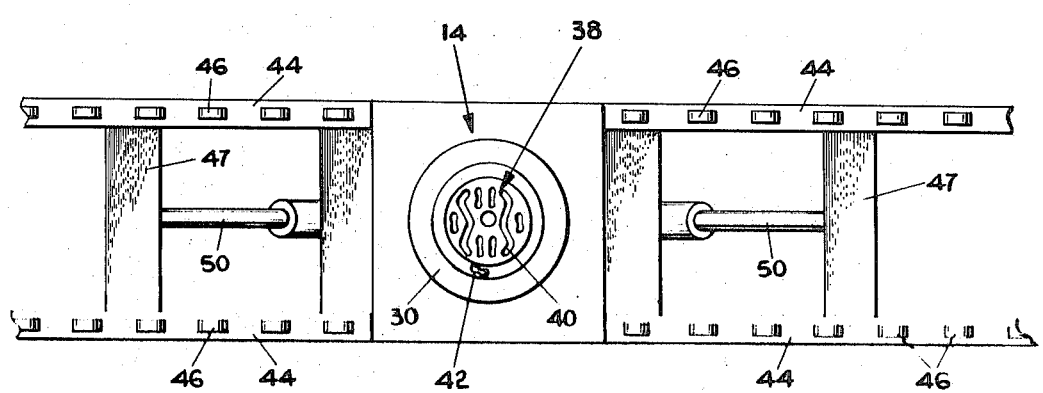
FIG. 2 is a top or plan view of the hold down table.

Referring now to the drawings, and to FIGS. 1 through 3 in particular, there is illustrated a pneumatic hold down table comprising a frame 12 which supports at the upper portion thereof a suction cup 14. The frame 12 is anchored at the bottom by a base 13. Support arms 16 and 18 are hinged to the frame 12 at either side thereof through hinges 20 and 22. Pneumatic cylinders 24 and 26 support the arm 16 and 18 respectively at the central portions thereof and control the raising and lowering of the arm.

The hold down table is desirably positoned in an assembly line adjacent on one side to a feed conveyor 28 and at the other side a take off conveyor 30. A workpiece 10 is shown in phantom lines in FIGS. 1 and 3 to illustrate the relationship between the workpiece 10, the arms 16 and 18, and the suction cup 14. A mechanism (not shown) for turning the workpieces over may be provided adjacent conveyors 28 or 30 so that the workpiece may be rolled directly from the hold down table to the turning mechanism.

Mounted to the face of the frame is a regulator valve 32 through which air is supplied to the pneumatic portions of the table. A 4-way valve 56, having an actuating handle 34, is also mounted to the face of the frame 12.

As illustrated in FIG. 2, the suction cup 14 has a peripheral sealing rim 36 and a recessed central portion 38. Ridges 40 are formed in the recessed central portion 38. A suction vent 42 is also positioned in the central portion 38 of the suction cup 14 for withdrawal of air.

Each of the support arms 16 and 18 preferably comprises a roller conveyor formed of side members 44 which support a plurality of rollers 46. A cross member 47 rigidly connects the two side members 44 of each arm. The workpiece 10 is supported by the rollers 46 and is easily moved across the rollers when the arms are in the up position illustrated in FIG. 1.

Each of the pneumatic cylinders 24 and 26 is pivotably mounted to the frame at a lower portion thereof as illustrated in FIG. 3 and has a piston rod 50 which extends upwardly and is pivotably mounted to the arms through a depending bracket 52. The cross member 47 retains the bracket 52.

Figure 4:
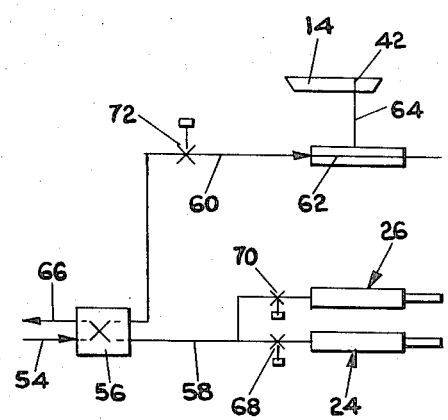
FIG. 4 is a schematic view of the pneumatic system which operates the hold down table.

Reference is now made to FIG. 4 for a description of the pneumatic system which operates the hold down table. Pressurized air is supplied from a source (not shown) through an air supply line 54 to the 4-way valve 56. The source of air can be a compressor or a cylinder of compressed air. Air lines 58 and 60 are connected to the valve for alternately supplying pressurized air to cylinders 24 and 26 and to a venturi valve 62. A suction line 64 is connected to the venturi valve at one end and to the suction vent 42 in the suction cup 14 at the other end thereof. An exhaust valve 66 is connected to the 4-way valve 56 in order to exhaust the air in either line 58 or 60. Desirably, regulators 68 and 70 are provided in the air supply lines for cylinders 68 and 70 respectively to control the speed of operation of the cylinders. In addition, a regulator 72 is desirably provided in the air line 60 for the venturi valve 62 to regulate the vacuum force created by the venturi.

The pneumatic hold down table works as follows: Initially, the arms 16 and 18 are in the up position as illustrated in FIG. 1. The workpiece 10 is rolled from conveyor 28 onto the arms so that it is approximately centrally located with respect to the suction cup 14. In this position, the pressurized air flows from air supply line 54 through valve 56 and into air line 58 to pressurize the cylinders 24 and 26. As illustrated in FIG. 1, the piston rods 50 are in the extended position. The plane of the tops of the rollers is slightly above the top of the suction cup 14 so that the workpiece 10 slides across the table without contacting the suction cup 14. The valve 56 is then switched so that the air in cylinders 24 and 26 is exhausted through air line 58, valve 56 and exhaust 66. This action is accomplished by throwing handle 34 downwardly. The pressurized air in line 54 passes through valve 56, through line 60 and through venturi valve 62, thereby drawing a vacuum on suction line 64. As the pressure leaves the cylinders 24 and 26, the piston rods 50 are retracted, thereby lowering the arms 16 and 18 until they reach the position llustrated in FIG. 3. As the arms are lowered, the workpiece is lowered from its position slightly above the suction cup 14 illustrated in FIG. 1 to the position resting on the suction cup. When the workpiece makes contact with the peripheral sealing rim 16 of the suction cup, the venturi valve 62 withdraws the air pressure from the suction cup, firmly holding the workpiece onto the suction cup. With the arms in the lowered position as illustrated in FIG. 3, the worker can work on every edge of the workpiece and can easily walk entirely around the workpiece.

After the operation on the workpiece 10 has been completed, the handle 34 is raised so that the valve 56 is switched back to the initial position, thereby exhausting pressure through line 60 and directing the pressurized air through line 58 into the cylinders 24 and 26. The piston rods 50 are thereby raised to raise the arms to the position illustrated in FIG. 1. As the arms are raised, the workpiece is lifted slightly off the suction cup 14 to resume the position illustrated in FIG. 1. The workpiece can then be rolled off the arms 16 and 18 and onto the take off conveyor 30.

In working with smaller pieces, the operator can cover the exhaust for the venturi and thereby converting the suction table to a floation table. The workpiece can then be removed and replaced with another small workpiece without operation of the conveyor arms.

The hold down table described above is simple in operation and construction. The table effectively operates to hold securely large and small workpieces for operation, yet, permits the workpieces to be rolled to and from the proper position on the table. The work table can be used in conjunction with means for rotating the workpiece over to expose the undersides thereof. The workpiece can be simply rolled on the conveyor arms to the rotating means and then rolled right back to the work table. The workpiece is thus completed without manual lifting and cumbersome rotation thereof. Yet, when the work is held by the table, the operator is permitted to walk completely around the workpiece without interference from the conveyor arms. The inventive work table has a unique and simplified fluid system, preferably of pressurized air, although other fluid systems such as hydraulics can also be employed. The system operates very effectively with a venturi valve so that a single source of power, i.e., fluid pressure, is used to raise and lower the conveyor arm as well as operate the vacuum. The hold down table is thus inexpensive in manufacture and operation.

Reasonable variation and modification are possible within the scope of the foregoing disclosure, drawings and the appended claims without departing from the spirit of the invention.

The embodiments of the invention in which an exclusive property or privilege is claimed are defined as follows:

1. In a hold down table for planar workpieces and the like, said table having a frame including a central support member for supporting said workpiece in a central portion thereof, and means for securely and releasably holding a workpiece in a fixed position on said central support to permit work to be done on said workpiece, the improvement which comprises:
   a pair of arms for supporting said workpiece a spaced distance above said support member, whereby said workpiece can slide on said arms into a position over said central support member;
   means mounting said arms on said frame adjacent said central support member for movement between a first position wherein said arms are disposed in a horizontal plane a spaced distance above the top of said central support member and a second position wherein said arms are disposed at or below a horizontal plane including the top of said central support member so that the workpiece can be lowered onto said central support member;
   means for moving said arms upwardly and downwardly between said first and second positions for effecting movement of said workpiece onto said central support member for engagement by said holding means and for removal of said workpiece from contact with said central support for movement of the workpiece with respect to said central support member.

2. A hold down table according to claim 1 wherein said central support member comprises a suction cup; and said holding means comprises means for drawing a vacuum on said suction cup.

3. A hold down table according to claim 2 wherein said vacuum drawing means includes a venturi valve and means to supply fluid pressure to said venturi valve.

4. A hold down table according to claim 3 wherein said moving means for said arms includes fluid cylinders and means coupling said cylinders to said fluid pressure supply means.

5. A hold down table according to claim 4 and further including valve means for controlling the fluid pressure to said venturi valve and said fluid cylinders such that said cylinders and said venturi valve are alternately coupled to said fluid pressure suppy means.

6. A hold down table according to claim 1 wherein said mounting means for each of said arms includes a link secured to the inner end of said arms and extending downwardly and inwardly of said arms, and means pivotably mounting said link to said frame.

7. A hold down table according to claim 6 wherein said mounting means include cylinders which are pivotably mounted to a bottom central portion of said frame so that said arms, when lowered, fold beneath said workpiece.

8. A hold down table for planar workpieces and the like, said table comprising:
  a frame;
  a support means including a suction cup mounted on said frame for supporting said workpiece in a central portion thereof;
  support arms on said frame for supporting a workpiece for lateral movement above said suction cup support means;
  means mounting said support arms for a vertical movement with respect to said support means;
  said mounting means including fluid pressure cylinders;
  a venturi valve operably coupled to said suction cup for drawing a vacuum therein;
  a source of fluid pressure; and
  valve means alternately coupling said source of fluid pressure with said venturi valve and said fluid pressure cylinders, whereby said venturi is operable to hold said workpiece by suction while said fluid pressure cylinders lower said support arms, and said venturi is inoperative when fluid pressure is supplied to said pressure cylinders to raise said support arms.

9. A hold down table according to claim 8 wherein said source of fluid pressure is a source of pressurized gas.

10. A hold down table according to claim 8 wherein said support arms contain rollers for sliding said workpiece over the top of said table.

11. A hold down table according to claim 1 wherein said mounting means is adapted to move said arms inwardly toward said frame in said second position to permit free access to all edges of said workpiece when said workpiece is held on said central support.

12. In a hold down table for planar workpieces and the like, said table having a frame including a central support member for supporting said workpiece in a central portion thereof, and means for securely and releasably holding a workpiece in a fixed position to permit work to be done on said workpiece, the improvement which comprises:
  a pair of arms mounted on said frame adjacent said central support member for supporting said workpiece for movement with respect to said central support member;
  means for effecting relative movement between said arms and said central support member, said movement means positioning said arms in a horizontal plane a spaced distance above the top of said central support member in a first position to permit free movement of said workpiece with respect to and without interference from said central support member, and said movement means positioning the top of said central support member at or above said arms in a second position so that said central support member can securely grip said workpiece in said second position.

* * * * *